United States Patent
Diedrick et al.

(10) Patent No.: US 9,981,334 B2
(45) Date of Patent: May 29, 2018

(54) DUAL POWER INTEGRATED MIG WELDER AND GENERATOR SYSTEM

(75) Inventors: Michael G. Diedrick, Appleton, WI (US); Adam P. Laabs, Brillion, WI (US); Gregory C. Baeten, Kaukauna, WI (US); Mark E. Peters, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1808 days.

(21) Appl. No.: 11/524,865

(22) Filed: Sep. 21, 2006

(65) Prior Publication Data
US 2008/0073330 A1 Mar. 27, 2008

(51) Int. Cl.
*B23K 9/10* (2006.01)
*B23K 9/32* (2006.01)

(52) U.S. Cl.
CPC .............. *B23K 9/32* (2013.01); *B23K 9/1006* (2013.01)

(58) Field of Classification Search
USPC ..... 219/133, 137 PS, 137.71, 130.21, 13.31; 322/27, 29
See application file for complete search history.

(56) References Cited

U.S. PATENT DOCUMENTS

| | | | |
|---|---|---|---|
| 5,355,075 A * | 10/1994 | Wilson | 322/25 |
| 5,968,385 A | 10/1999 | Beeson et al. | |
| 6,121,691 A * | 9/2000 | Renner | 290/40 A |
| 6,348,671 B1 | 2/2002 | Fosbinder et al. | |
| 6,359,259 B1 * | 3/2002 | Bunker et al. | 219/133 |
| 6,528,765 B2 * | 3/2003 | Bunker et al. | 219/133 |
| 6,924,460 B1 * | 8/2005 | Stava | 219/133 |
| 6,982,398 B2 * | 1/2006 | Albrecht | 219/133 |
| 7,211,764 B2 * | 5/2007 | Leisner et al. | 219/133 |
| 7,642,487 B2 * | 1/2010 | Silvestro | 219/133 |
| 7,838,797 B2 * | 11/2010 | Albrecht | 219/133 |
| 8,080,761 B2 * | 12/2011 | Matthews et al. | 219/130.1 |
| 8,476,555 B2 * | 7/2013 | Diedrick et al. | 219/137.2 |
| 2005/0161450 A1 | 7/2005 | Stava | |

FOREIGN PATENT DOCUMENTS

WO 96/23350 8/1996

* cited by examiner

*Primary Examiner* — Dana Ross
*Assistant Examiner* — Ayub Maye
(74) *Attorney, Agent, or Firm* — McAndrews, Held & Malloy, Ltd.

(57) ABSTRACT

An integrated welding system is described that includes an engine-driven power supply, control circuitry for regulating power from the power supply and for delivering power suitable for welding, and a wire feeder driven by the generated power for delivering a continuous feed of wire electrode. The system is suitable for MIG and flux core welding applications, and may further include an optional gas supply for a shielding gas. Other power is available in the system, such as for running conventional 120V and 240V power tools, lights and so forth. The unit may also be operated from an external power source, typically the power grid. The unit may be designed to permit selective operation in accordance with constant voltage and constant current regimes for MIG, TIG and stick welding.

24 Claims, 4 Drawing Sheets

DUAL POWER INTEGRATED MIG WELDER AND GENERATOR SYSTEM

BACKGROUND

The invention relates generally to the field of welding systems, and particularly to a portable, engine driven welding system including a generator and power supply as well as a wire feeder for performing various types of welding operations.

A number of forms of welding are known and are generally used in the art. These include metal inert gas (MIG) welding, tungsten inert gas (TIG) welding, and stick welding systems. In MIG systems, electrical current is applied to a wire electrode and an arc is established between a grounded work piece and the electrode. The wire electrode is advanced through a welding torch and is generally consumed as the work piece is melted due to heat released by a sustained arc, while a shielding gas surrounds the progressing weld. A variant of MIG welding is flux core welding, in which a flux is integrated into welding wire and no shielding gas is required. In TIG welding, on the contrary, a non-consumable tungsten electrode is used to establish an arc with a work piece, the work piece material being melted and fused to form a weld, often with the addition of consumable material which is melted and added to weld under the heat of the arc. Stick welding involves establishing an arc between a stick electrode which is often surrounded by a flux material. The stick electrode is generally consumed and its metal is fused with melted metal of the work piece as the welding operation continues under the heat of an established arc. These welding techniques may be used on different types of material or for different applications, but multiple techniques are often used by a welding operator depending upon the particular needs of an application.

One difficulty in many welding applications is the need for mobility. Many complex welding systems are quite heavy and are intended only for stationary use, with work pieces being transported to the welding location. Other applications for welding, however, involve work pieces in locations that cannot be easily transported. In such applications, portable welding systems have been developed that typically include an engine driving a generator to develop electrical power required to sustain the arc used for welding. Many such systems are specifically designed for either TIG, MIG or stick welding. Where systems of this type provide any flexibility in the type of welding system that can be used, this is typically been done by the addition of add-on or optional components.

At present, there are no convenient engine-driven welding power supplies that include integral wire feeders for MIG or flux core welding. Such systems typically provide for stick welding only, and may not be configured to provide the type of power or power control suitable for MIG welding. For example, stick and TIG welding typically rely on constant current power control regimes, whereas MIG welding systems typically rely on constant voltage power control. Because no integral wire feeder is typically provided on such engine-driven systems, MIG welding operations, if possible at all, can be performed only with the use of a separate wire feeder which must be field attached to the welding power supply. Such separate units entail additional cost, must be transported separately, and must be interfaced with the welding power supply each time a MIG welding operation is to be performed.

There is a need, therefore, for improved welding systems and welding power supplies that can allow for MIG welding by means of an integral unit. There is also a need in the field for a welding power supply of this type which can be used for multiple types of welding operations by means of a single integrated unit.

BRIEF DESCRIPTION

The invention provides a novel power supply and a welding system designed to respond to such needs. The power supply includes an engine-driven generator, the output power of which is conditioned and converted to power levels suitable for welding. The integral unit also includes a wire feeder for supplying continuous wire feed used for MIG or flux core welding. The system may also include a gas supply, where necessary, for MIG welding. Power, and power control may also permit stick welding and TIG welding. Accordingly, the system may include control circuitry for regulating power in accordance with constant voltage and constant current regimes. The system may also allow for operation of the power supply from a power grid or other external power source, such as through a typical grounded receptacle. Where desired, the power supply may be configured as a cart or other transportable device that also provides local electrical service, such as for powering work lights, power tools, or any other loads at the welding location.

Thus, in accordance with certain aspects of the invention, a welding system is provided that includes an engine that drives a generator for generating electrical power. A control circuit is coupled to the generator for conditioning the electrical power to power suitable for welding. The system further includes a wire feeder coupled to the control circuit for receiving power for driving a wire electrode through a supply cable to a welding torch.

The control circuit may be configured to provide power for welding in accordance with a constant current regime or a constant voltage regime. Thus, the system may enable MIG, flux core, TIG or stick welding, as well as plasma cutting. Also, the control circuit may be configured to regulate the drive speed of the wire feeder based upon such parameters as the current and/or voltage applied to the welding torch.

In accordance with another aspect of the invention, a welding system includes an engine and a generator coupled to the engine for generating electrical power. A control circuit is again coupled to the generator for conditioning the electrical power to power suitable for welding. The control circuit may selectively draw power from the generator or from an alternative power source. The system again includes a wire feeder coupled to the control circuit for receiving power for driving a wire electrode through a supply cable to a welding torch.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
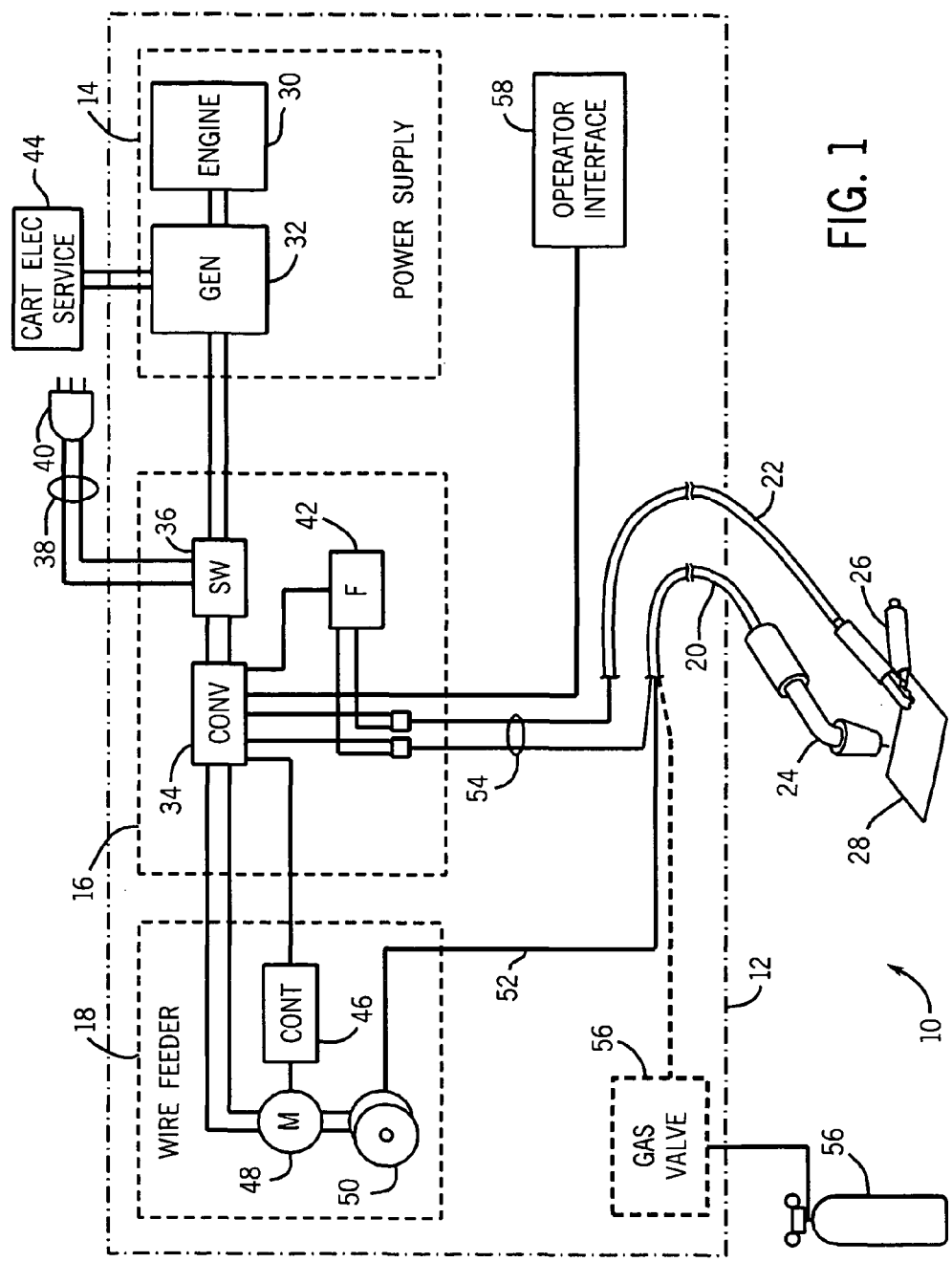
FIG. 1 is a diagrammatical representation of an exemplary welding system and power supply in accordance with aspects of the present invention.

Turning now to the drawings, and referring first to FIG. 1, a welding system in accordance with the invention is illustrated and designated generally by reference numeral 10. The welding system includes a portable or mobile unit 12 which is generally integral in that it contains a power supply 14, control circuitry 16, and a wire feeder 18. As noted below, the portable unit 12 may be configured as a cart that can be rolled to a welding location, or may be a relatively small unit that can be physically transported by one or two operators. However, it should be understood that the portable unit is not limited to any particular size, but may more generally be thought of as a system that is not intended for stationary use, but can be moved to a welding location.

In general, the system provides welding resources to a power/service supply cable 20 and to a ground cable 22. The supply cable 20 is coupled to a welding torch 24, in the illustrated example a MIG welding torch. The ground cable 22 is coupled to a ground clamp 26 which may be attached to a work piece 28. As will be appreciated by those skilled in the art, in use, a welding operator contacts an electrode in the welding torch with the work piece to complete an electrical circuit and thereby to create an arc used to melt metal and perform the welding operation.

While reference will be made in the present discussion to MIG welding torches and to MIG welding in general, it should be borne in mind that the welding system 10, while including a wire feeder for performing MIG welding operations, is not necessarily limited to such operations. That is, the welding system may be designed for MIG-only use. In such cases, the power supply described below and power control circuitry may be designed for constant voltage power control regimes only. However, the presently contemplated embodiments may also serve for stick welding and TIG welding. Thus, while not illustrated in FIG. 1, stick welding power supply cables may be coupled to the unit to supply power to a clamp-type stick electrode holder which is used for stick welding operations. Similarly, TIG welding cables may also be coupled to the power supply for TIG welding. As will be appreciated by those skilled in the art, the power control circuitry, then, may be designed for selective operation in a constant current power control regime.

The system illustrated in FIG. 1 has an engine-driven power supply 14 that generally includes an engine 30 and a generator 32. In the illustrated embodiment, the engine and generator set form a compact and portable unit having a small footprint that occupies little space at the welding location, and can be transported by a single operator. However, as noted above, larger packages may also be envisaged. The presently contemplated embodiment uses a single-cylinder gasoline engine, such as a 10 HP engine running at a nominal speed of 3600 RPM. Other, larger engines may, of course be used, including multiple cylinder engines and diesel engines. While not illustrated in FIG. 1, the unit also includes an appropriate fuel tank for supplying necessary fuel for running the engine. The presently contemplated embodiment utilizes an air-cooled engine, although, here again, liquid-cooled engines may also be employed. The engine directly drives the generator 32 which, in a presently contemplated embodiment has a rated power output of either 4500 Watts peak, 4000 Watts continuous, or 6000 Watts peak, 5500 Watts continuous power output. As with engine 30, however, other generators and power ratings can, of course, be employed.

Power from generator 32 is conditioned by control circuitry 16 that includes a converter 34. A switch 36 is coupled to output from the generator 32 to enable the control circuitry, and the welding system in general to operate alternatively from grid power or another external power supply. A power cable 38 is routed to switch 36 and may be terminated by a conventional grounded plug 40. Operation of switch 36, then, may reconnect the control circuitry, wire feeder, and in general the portable unit from the power supply 14 to grid or external power via the power cable 38. It should be noted that in certain configurations, arrangements other than an integrated cable or cord may be made for providing power to the system, such as plug receptacles that receive a separate power cord plug.

In general, the circuitry may include a converter or signal conditioning circuitry 34 which smoothes and conditions the power output by the generator, and may transform power to one or more output levels. In certain embodiments, the converter includes a center tap coil that enables 120V and 240V service output for lamps, power tools, and so forth. Other conversion techniques may, of course, be provided for auxiliary power. Moreover, other power levels and types could also be provided, such as for markets outside of North America. In certain presently contemplated embodiments, the control circuitry 16 allows for operation both from the grid as well as by output of the engine-drive generator 32. For example, an operator may perform welding operations while coupled to the power grid via power cable 38, while running engine 30 for providing output power service locally, such as for lights or power tools. Alternatively, the control circuitry may permit either grid power or engine-generated power solely.

As will be appreciated by those skilled in the art, within the control circuitry, the electrical output of the generator may be provided to a rectifier, which produces rectified dc power. The rectified dc power is provided to converter 34, which may include, as in a presently contemplated embodiment, at least one energy storage device such as a capacitor for smoothing the ripple in the rectified signal to provide a dc bus. An alternative embodiment may use a dc generator instead of ac generator and rectifier, or the rectifier may be part of the generator, or between the generator and the converter.

Converter 34 may also include an inverter and rectifier that convert the smoothed and rectified dc signal to a welding output (having an appropriate current and voltage). Converter 34 may be, for example, a series resonant converter that inverts the dc bus and an output rectifier to produce a dc welding current as the welding output. An ac output may also be used in an alternative embodiment. Suitable series resonant converters are generally known in the art. For example, a power control circuit may be included in converter 34 such that the welding current is selected by the operator, and the converter provides the desired current. Various control functions including a hot start and a protection system may also be provided. Moreover, the converter may also be adapted.

Other converters, such as hard switched inverters and choppers, may also be used to implement the present invention. The specific converter or inverter selected is not important, so long as it is properly controlled to provide the desired output power. In general, converter 34, as used herein, is a switched circuit that converts an ac or dc input to a different ac or dc output. When implemented as an inverter, the converter will typically include a switched circuit having a dc input and provides an ac output, or one that has an ac input and a rectifier to produce a dc signal that is then switched to produce an ac output. Also, an inverter, as used herein, may include an output rectifier to produce a dc output.

The converter 34 may also include a phase controller, although other types of controllers may be employed, as noted above. In practice, although not represented separately in FIG. 1, converter may include a microprocessor or other control circuitry along with appropriate memory for controlling the operation of the processor. Control regimes stored in the controller will allow for one or more types of power control regimes. Where the system is designed for MIG-only use, for example, the controller can be programmed for constant voltage control only. Alternatively, the controller can be configured for operation in constant current regimes and constant voltage regimes. Thus, the unit may be used by an operator selectively for performing MIG welding operations, TIG welding operations, or stick welding. Moreover, in the constant current control regimes the power control circuitry may perform secondary conversion or direct conversion, such as for providing direct current power for stick and TIG welding. Where desired, feedback, as represented generally by reference numeral 42, may be provided for closed-loop operation of the converter 34, such as based on voltage and/or current feedback, acquired from the conductors used to channel power from the converter. In certain applications and for certain types of operations, such feedback may not be required.

Power from the generator 32 is also provided for local electrical service at the cart via receptacles, as indicated by reference numeral 44 in FIG. 1, and a described in greater detail below. As will be appreciated by those skilled in the art, such local electrical service may be used to supply power for various loads, such as lights and hand tools.

The wire feeder 18 is also coupled to the control circuitry 16 and receives power from the control circuitry. The wire feeder is equipped with a controller 46 for regulating the feed speed of wire from the wire feeder, which may be linked to controller 46. For example, the controller 46 may allow for operator control of the feed speed of the wire electrode, or the speed may be regulated as a function of other process variables controlled by the control circuitry 16. Such variables may include, for example, the current applied to the welding torch by the controller 42, particularly in constant voltage mode. The motor 48 drives a wire spool assembly 50 to advance wire electrode as indicated generally by reference numeral 52. The wire electrode, for MIG welding, is fed into the supply cable 20 along with one of two power conductors 54 coupled to the converter 34. Another of the conductors 54 is coupled to the ground cable 22 to complete the electrical circuit through the work piece. Where desired, the unit may also be provided with an optional gas supply 56, such as an inert or active gas used for shielding of the weld, typically in MIG welding or TIG welding operations. As will be appreciated by those skilled in the art, where a flux core wire electrode is used in MIG welding, such gas supplies may not be required.

The welding system 10 illustrated in FIG. 1 is also provided with an operator interface 58 which will typically be a control panel having switches and dials or knobs for setting the various operational parameters of the system. As described more fully below with reference to FIG. 4, and in the presently contemplated embodiment, for example, the operator interface may allow for setting the type of welding operation to be performed (e.g., MIG, TIG or stick), as well as currents or voltages desired, and other welding operating parameters. Where the feed speed of wire electrode is not automatically controlled by controller 46 or control circuitry 16, the operator interface may also permit manual setting of the electrode feed speed.

Figure 2:
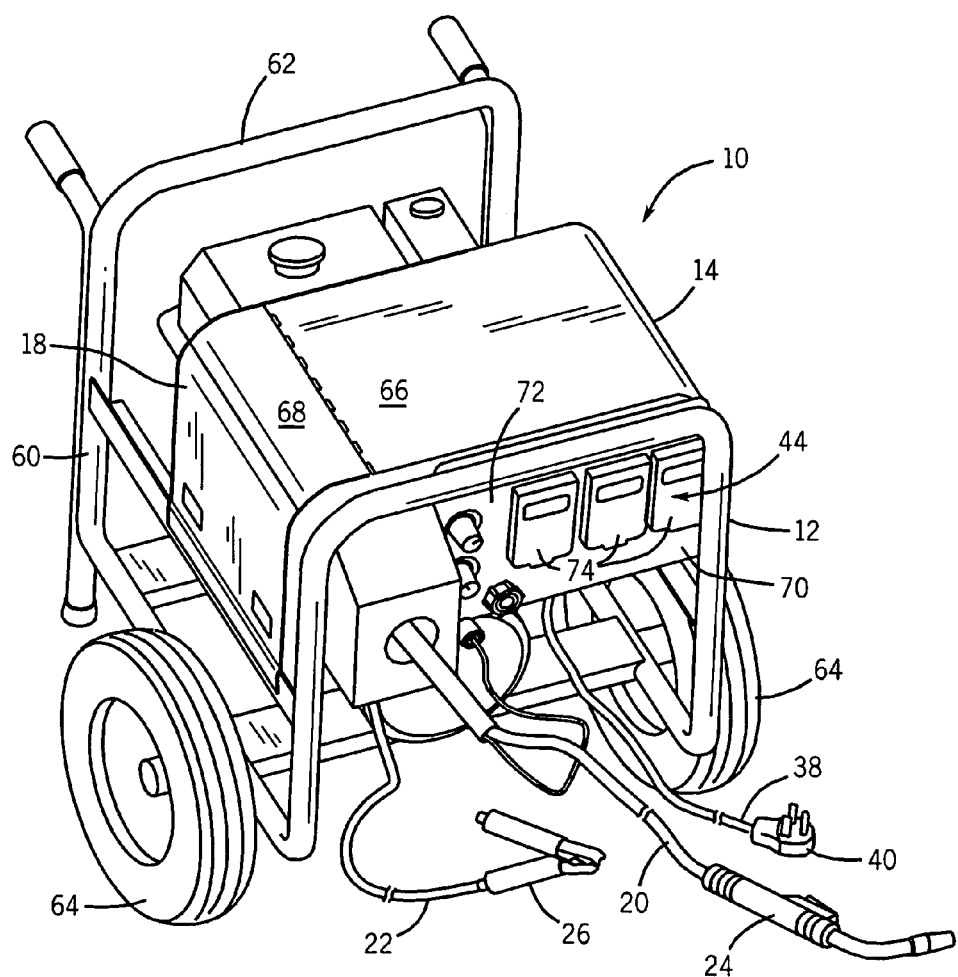
FIG. 2 is a perspective view of a presently contemplated implementation of the system of FIG. 1 illustrating how the component subsystems may be mounted on a portable frame or cart.

FIG. 2 is a perspective view of an exemplary implementation of a welding system of the type described above. As illustrated in FIG. 2, welding system may be configured as a cart or other portable assembly, as indicated generally by reference numeral 60. In the present embodiment illustrated, the unit is constructed on a tubular frame 62 and is provided with wheels 64 for easily moving the cart from place to place. The components described in FIG. 1 and discussed above are generally mounted in an enclosure 66 comprising a number of panels 68 which can be removed or displaced to access the components within the cart. A front panel 70 includes the various controls and cable connections discussed above, particularly with respect to the operator interface 58 and the electrical service 44. The front panel, thus, includes a control panel 72 where the various adjustments can be made for setting the regime of the control circuitry, where provided, as well as various welding settings. Moreover, as illustrated in FIG. 2, the front panel 70 includes a number of receptacles 74, shown covered by optional covers in the figure, which allow for plug-in connection of power tools, lights, and other devices. In a presently contemplated embodiment, electrical service is provided in the front panel at 60 Hz and 120V and well as 240V.

Figure 3:
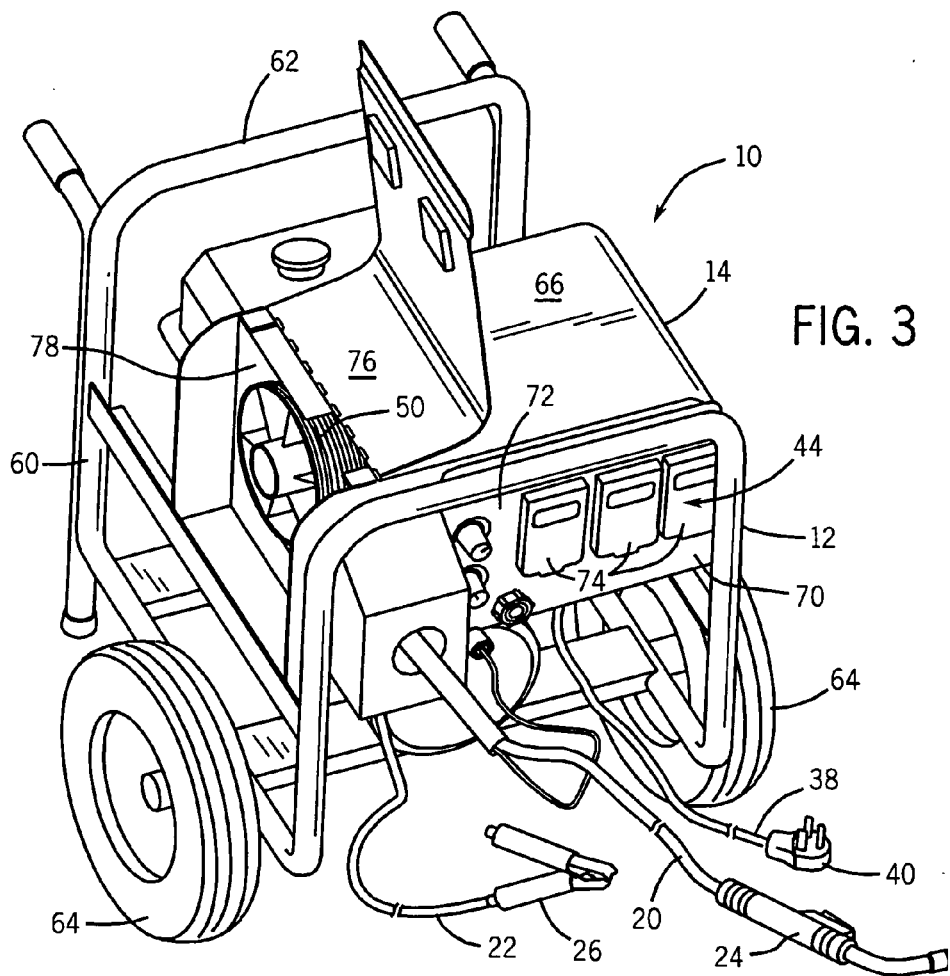
FIG. 3 is a perspective view of the system of FIG. 2 in which a portion of the enclosure has been opened to reveal the integral wire feeder powered from the engine-driven generator.

FIG. 3 illustrates the same cart embodiment but in which a movable panel 76 has been raised to expose one of the compartments 78 of the cart. In the illustration of FIG. 3, for example, the wire feeder spool assembly 50 is lodged in the open compartment 78. Such accessible compartments are preferred in the illustrated embodiment for accessing the various components, servicing the components, changing wire spools, and so forth. Where desired, certain of the compartments may be inaccessible, or may be covered by enclosure portions which can only be removed with hand tools.

Figure 4:
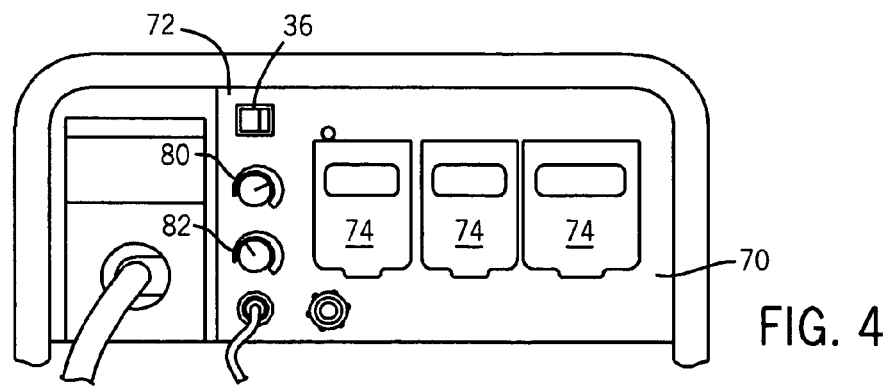
FIG. 4 is a front elevational view of the system of FIG. 2 illustrating an exemplary physical layout for a control panel or operator interface for regulating welding operations.

FIG. 4 is a front elevational view of the same cart embodiment illustrating an exemplary control panel. In the embodiment of FIG. 4, the control panel includes connections for the welding cable, controls for the welding cable, as well as the power receptacles described above. Moreover, the front panel provides access to the switch 36 described above, which permits selection of the source of power for welding, either external (e.g., the power grid) or power from the integrated generator. The illustrated front panel also provides a user-selectable wire feed speed control 80, as well as a user-selectable welding voltage control 82.

Figure 5:
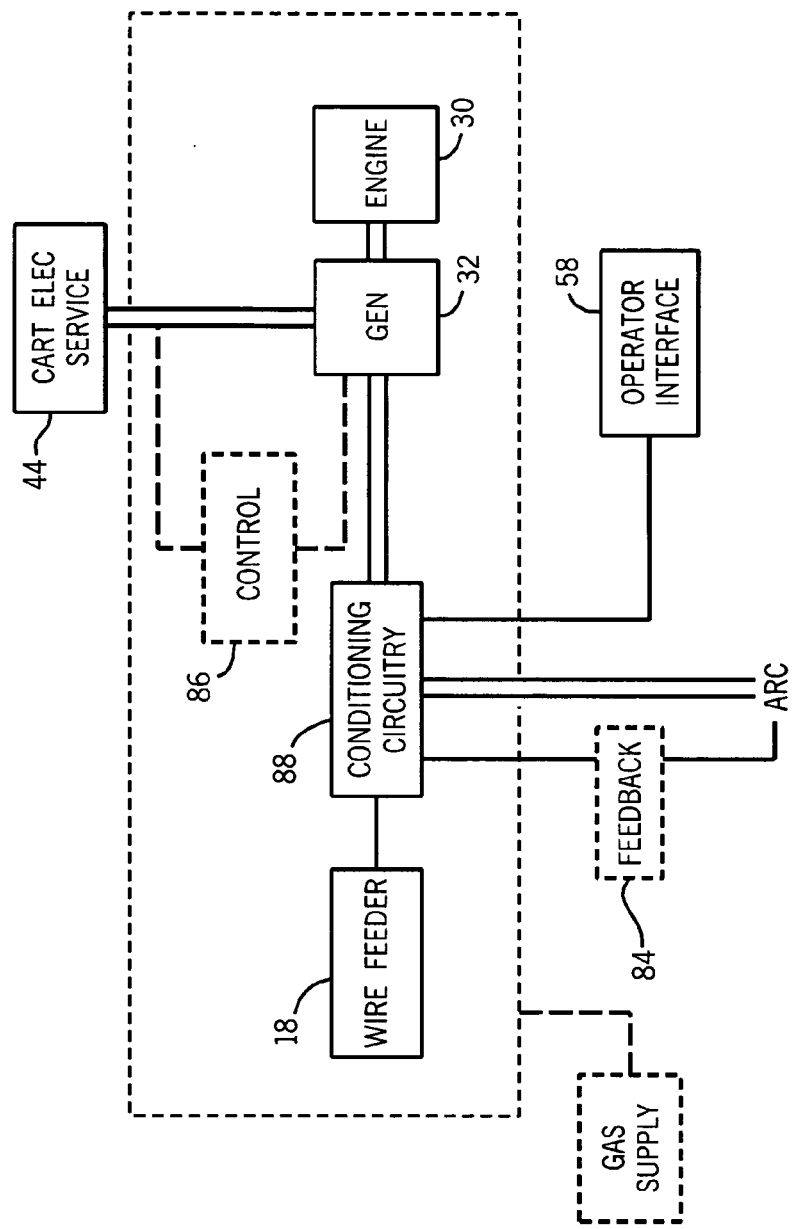
FIG. 5 is a diagrammatical view of a variant of the system represented in FIG. 1, showing optional feedback control for welding power and auxiliary power provided by the unit.

As noted above, the power generation and control circuitry included in the various embodiments of the invention may be adapted for "direct conversion" and may be based on either open-loop or closed-loop operation. FIG. 5 represents an exemplary configuration of the system described in detail above, but in which feedback is provided both for welding power and for auxiliary or local power service. That is, in applications in which the welding power is to be regulated in a closed-loop manner, feedback 84 may be provided, including current and/or voltage feedback. Moreover, the auxiliary or local power service 44 may be regulated in a closed loop manner via a controller 86 that may control operation of the engine 30 and/or generator 32 based upon parameters of the electrical power provided by the generator.

FIG. 5 also illustrates an arrangement in which welding power is produced by "direct conversion". That term, as used herein generally means that power from the generator is not switched, but is typically simply rectified and filtered (e.g., choked). This is done in the conditioning circuitry 88 represented in FIG. 5. This may be a multi-range device that establishes the power output needed for the welding operation.

As will be appreciated by those skilled in the art, other physical configurations for the present invention may be envisaged. For example, the tubular frame and cart construction of FIGS. 2, 3, 4 and 5 is illustrated here by way of example only. Other constructions, including arrangements which can be transported by a single operator or by two operators, or that can be displaced by means of lifting hooks and other arrangements, may certainly fall within the scope of the appended claims. In the illustrated embodiment, moreover, the control circuitry, engine and generator are provided in a side-by-side arrangement with the wire feeder. Other arrangements may, of course, be envisaged. Moreover, the controls illustrated on the front panel 70 may, in certain settings, be covered with a protective shield. These controls may also include further user-adjustable controls, such as for selecting between constant voltage control and constant current control regimes for MIG, TIG and stick welding. Where accommodations are made for TIG and stick welding, appropriate cables and/or receptacles may be provided in the system for delivering the needed current and grounding connections to the work piece. Such connections would typically be made on the front of the unit, although other positions could serve as well. Where a gas supply is to be included in the unit, this may be mounted beneath the engine and generator, or along any side, typically the rear side of the embodiment illustrated.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
   a housing;
   an engine disposed in the housing;
   a generator disposed in the housing and coupled to the engine for generating a first electrical power output;
   a control circuit and a converter disposed in the housing and coupled to the generator for receiving the first electrical power, wherein the converter is configured to convert the first electrical power output to a welding power output; and
   a wire feeder disposed in the housing and coupled to the converter for receiving power for driving a wire electrode through a supply cable to a welding torch, wherein the engine, the generator, the control circuit and the wire feeder are commonly mounted on a common support with the housing.

2. The welding system of claim 1, wherein the converter is configured to provide the welding power output in accordance with a constant voltage regime suitable for metal inert gas or flux core welding.

3. The welding system of claim 1, wherein the generator is configured to generate the first electrical power output of less than approximately 6 kW.

4. The welding system of claim 1, further comprising integral power cables for delivering the welding power output and the wire electrode to the welding torch and for grounding a work piece.

5. The welding system of claim 1, further comprising a power supply cord coupled to the control circuitry and to an electrical grid for providing a second electrical power output to the converter to weld independently of power from the generator.

6. The welding system of claim 1, further comprising at least one receptacle for providing alternating current power to a load coupled to the welding system.

7. The welding system of claim 1, wherein the control circuit is coupled to the wire feeder for regulating feed speed of wire electrode as a function of a welding parameter.

8. The welding system of claim 2, wherein the converter is also configured to provide the welding power output in accordance with a constant current regime suitable for TIG or stick welding, or plasma cutting.

9. The welding system of claim 5, wherein the power supply cord and the electrical grid are coupled to a switch to selectively provide the first electrical power output or the second electrical power output to the converter for conversion to the welding power output.

10. The welding system of claim 6, wherein alternating current power is provided at 120V and 240V.

11. The welding system of claim 7, wherein the welding parameter is current and/or voltage applied to a welding electrode.

12. A welding system comprising:
    a housing;
    an engine disposed in the housing;
    a generator disposed in the housing and coupled to the engine for generating a first power output;
    a converter disposed in the housing and coupled to the generator for receiving the first power output, wherein the converter is configured to convert the first power output to welding power suitable for welding in accordance with-metal inert gas welding, flux core welding, tungsten inert gas welding, stick welding, or plasma cutting; and
    a wire feeder disposed in the housing and coupled to the converter for receiving power for driving a wire electrode through a supply cable to the welding torch, wherein the engine, the generator, the control circuit and the wire feeder are commonly mounted on a common support with the housing.

13. The welding system of claim 12, wherein the welding power from the converter is suitable only for metal inert gas welding.

14. The welding system of claim 12, wherein a control circuit is coupled to the wire feeder for regulating feed speed of wire electrode as a function of a welding parameter.

15. The welding system of claim 14, wherein the welding parameter is current and/or voltage applied to the wire electrode.

16. A welding system comprising:
    a welder, comprising:
       a housing;
       an engine disposed in the housing;
       a generator disposed in the housing and coupled to the engine for generating a first electrical power output;
       a control circuit and a converter disposed in the housing and coupled to the generator for receiving the first electrical power output, the converter drawing the first electrical power output from the generator and converting the first electrical power output to a weld power output suitable for MIG or flux core welding; and a wire feeder disposed in the housing and coupled to the control circuit for receiving power for driving a wire electrode through a supply cable to a welding torch, wherein the engine, the generator, the control circuit and the wire feeder are commonly mounted on a common support with the housing.

17. The welding system of claim 16, wherein the first electrical power output generated by the generator is provided to at least one receptacle for providing alternating current power to a load coupled to the welding system.

18. The welding system of claim 17, wherein alternating current power is provided at 120V and 240V.

19. A welding system comprising:
a housing;
an engine disposed in the housing;
a generator disposed in the housing and coupled to the engine for generating a first electrical power output;
a control circuit disposed in the housing comprising a converter coupled to the generator for providing electrical power output; and
a wire feeder disposed in the housing coupled to the control circuit for receiving power for driving a wire electrode through a supply cable to a welding torch, and for regulating feed speed of wire electrode as a function of current and/or voltage applied to a welding electrode, wherein the engine, the generator, the control circuit and the wire feeder are commonly mounted on a common support with the housing.

20. The welding system of claim 19, wherein a switch is disposed in a front panel of the welding system to selectively draw power from the generator or from an external power source.

21. A welding system comprising:
a housing;
an engine disposed in the housing;
a generator disposed in the housing and coupled to the engine for generating a first electrical power output;
a conditioning circuit coupled to the generator to condition the first electrical power output from the generator to provide a weld power output suitable for welding; and
a wire feeder disposed in the housing for driving a wire electrode through a supply cable to a welding torch, wherein the engine, the generator, the conditioning circuit and the wire feeder are commonly mounted on a common support with the housing.

22. The welding system of claim 21, wherein the conditioning circuit rectifies and filters the first electrical power output from the generator to provide the weld power output.

23. The welding system of claim 21, wherein the wire feeder is coupled to the conditioning circuit for receiving power to drive the wire electrode.

24. The welding system of claim 21, wherein the conditioning circuit is also coupled to an external source of power configured to provide a second electrical power output, and the conditioning circuit is configured to selectively condition either the first electrical power output or the second electrical power output to provide the weld power output suitable for welding.

* * * * *